United States Patent
Sydon et al.

(10) Patent No.: US 6,278,742 B1
(45) Date of Patent: Aug. 21, 2001

(54) METHOD AND SYSTEM FOR POWER-CONSERVING INTERFERENCE AVOIDANCE IN COMMUNICATION BETWEEN A MOBILE UNIT AND A BASE UNIT IN A WIRELESS TELECOMMUNICATION SYSTEM

(75) Inventors: Uwe Sydon, Round Rock; Juergen Kockmann, Austin; Paulus Sastrodjojo, Round Rock; Sheng Guan, Austin, all of TX (US)

(73) Assignee: Siemens Information and Communication Mobile LLC., Austin, TX (US)

( * ) Notice: Subject to any disclaimer, the term of this patent is extended or adjusted under 35 U.S.C. 154(b) by 0 days.

(21) Appl. No.: 09/444,028

(22) Filed: Nov. 19, 1999

(51) Int. Cl.$^7$ ..................................... H04B 15/00
(52) U.S. Cl. ........................ 375/285; 455/69; 455/522
(58) Field of Search ........................ 375/130, 132, 375/227, 228, 259, 285, 296, 346, 348; 455/70, 68, 69, 522; 370/311; 714/704, 712

(56) References Cited

U.S. PATENT DOCUMENTS

| | | | |
|---|---|---|---|
| 5,257,283 | * 10/1993 | Gilhousen et al. | 375/130 |
| 5,265,119 | * 11/1993 | Gilhousen et al. | 375/130 |
| 5,267,262 | * 11/1993 | Wheatley, III | 375/130 |
| 5,485,486 | * 1/1996 | Gilhousen et al. | 375/130 |
| 5,812,938 | * 9/1998 | Gilhousen et al. | 375/130 |
| 5,933,781 | * 8/1999 | Willenegger et al. | 455/522 |
| 5,943,610 | * 8/1999 | Endo | 455/69 |

* cited by examiner

*Primary Examiner*—Chi Pham
*Assistant Examiner*—Jean B. Corrielus

(57) ABSTRACT

A method for avoiding interference in a wireless telecommunication system is provided. The method includes providing communication between a first and second component at an initial frequency. A plurality of successive line quality indicators is determined at a line quality monitor of the first component. Consecutive line quality indicators are summed over a predetermined time to determine a slow hop count. A determination is made as to whether the slow hop count is greater than a slow hop threshold. A determination is made as to whether to provide communication with the first component at a second frequency when the slow hop count is greater than the slow hop threshold. This determination is based on a power level of the second component and a communication strength received from the second component at the first component. A signal is communicated from the first component to the second component requesting the second component to provide communication at the second frequency.

12 Claims, 2 Drawing Sheets

METHOD AND SYSTEM FOR POWER-CONSERVING INTERFERENCE AVOIDANCE IN COMMUNICATION BETWEEN A MOBILE UNIT AND A BASE UNIT IN A WIRELESS TELECOMMUNICATION SYSTEM

RELATED APPLICATIONS

This application is related to the following co-pending Applications all filed on Nov. 19, 1999:

Ser. No. 09/443,939, entitled System and Method for Wireless Communication Incorporating Error Concealment;

Ser. No. 09/443,999, entitled System and Method for Simultaneously Testing Multiple Cordless Telephones;

Ser. No. 09/444,033, entitled System and Method for Testing An Assembled Telephone;

Ser. No. 09/444,058, entitled System and Method for Wireless Communication Incorporating Range Warning;

Ser. No. 09/443,968, entitled Method and System for Wireless Telecommunication Between A Mobile Unit and A Base Unit;

Ser. No. 09/443,931, entitled Method and System for Avoiding Periodic Bursts of Interference In Wireless Communication Between A Mobile Unit and A Base Unit;

Ser. No. 09/444,008, entitled Method and System for Changing States In A Wireless Telecommunication System;

Ser. No. 09/443,933, entitled Method and System for Wireless Communication Incorporating Distinct System Identifier Bytes to Preserve Multi-frame Synchronization for Systems with Limited Control Channel Bandwidth;

Ser. No. 09/443,972, entitled System and Method for Wireless Communication Incorporating Synchronization Concept for 2.4 Ghz Direct Sequence Spread Spectrum Cordless Telephone System;

Ser. No. 09/443,166, entitled System And Method For Wireless Communication Incorporating Overloading Prevention Techniques for Multi-frame-synchronized Systems;

Ser. No. 09/443,998, entitled System and Method for Wireless Communication Incorporating Preloaded Response Message;

Ser. No. 09/444,057, entitled Method and System for a Wireless Communication System Incorporating Channel Selection Algorithm for 2.4 Ghz Direct Sequence Spread Spectrum Cordless Telephone System;

Ser. No. 09/443,997, entitled Method and System for Transmitting and Receiving Caller Id Data in a Wireless Telephone System;

Ser. No. 09/443,937, entitled Method and System for Prioritization of Control Messages In A Wireless Telephone System;

Ser. No. 09/443,996, entitled Method and System for Wireless Telecommunications Using a Multiframe Control Message;

Ser. No. 09/443,936, entitled Method and System for Transmitting Caller Id Information from a Base Station to a Mobile Unit Outside the Context of an Incoming Call; and Ser. No. 09/443,942, entitled Method and System for Data Compression.

TECHNICAL FIELD OF THE INVENTION

This invention relates generally to the field of telecommunications and, more specifically, to a method and system for power-conserving interference avoidance in communication between a mobile unit and a base unit in a wireless telecommunication system.

BACKGROUND OF THE INVENTION

As society grows more complex and operates at an ever accelerating pace, there has been a growing need for better and more flexible communication devices. One area that has experienced substantial development activity is the area of wireless communication. Wireless telephone systems are also known as portable, cordless or mobile telephone systems. A typical wireless communication system has a base station located at a customer's or user's premises. The base is connected to the Public Switched Telephone Network (PSTN) over a wireline interface and communicates with a mobile unit or handset over an air interface that permits the user to communicate remotely from the base station. While users desire the freedom and flexibility afforded by mobile wireless communications systems, they typically do not want to sacrifice the numerous features, such as caller ID, that are available through the wireline service over the PSTN. In addition, users of wireless systems increasingly demand a voice quality that is as good as the voice quality available over a wireline link.

In the past, the enhanced features and high voice quality demanded by users have been achieved by the use of sophisticated and complex algorithms and methods that require substantial processor resources and large amounts of memory. These processing and memory resources are not only expensive but also place a substantial drain on battery power, therefore shortening the effective use of the mobile unit. Other technical problems associated with the need for using faster and more powerful processors include larger packaging to accommodate the larger-sized components and to dissipate the heat generated by such units. In the past, wireless systems have been large and bulky and have weighed more than what is satisfactory to many users.

While wireless communication devices and methods have provided an improvement over prior approaches in terms of features, voice quality, cost, packaging size and weight, the challenges in the field of wireless telecommunications have continued to increase with demands for more and better techniques having greater flexibility and adaptability.

Therefore, a need has arisen for a new method and system for power-conserving interference avoidance in communication between a base unit and a mobile unit in a wireless telecommunication system.

SUMMARY OF THE INVENTION

In accordance with the present invention, a method and system for power-conserving interference avoidance in communication between a mobile unit and a base unit in a wireless telecommunication system are provided that substantially eliminate or reduce disadvantages and problems associated with previously developed systems and methods.

A method for avoiding interference in a wireless telecommunication system is disclosed. The method includes providing communication between a first and second component at an initial frequency. A plurality of successive line quality indicators is determined at a line quality monitor of the first component. Consecutive line quality indicators are summed over a predetermined time to determine a slow hop count. A determination is made as to whether the slow hop count is greater than a slow hop threshold. A determination is made as to whether to provide communication with the first component at a second frequency when the slow hop count is greater than the slow hop threshold. This determination is based on a power level of the second component and a communication strength received from the second component at the first component. A signal is communicated from the first component to the second component requesting the second component to provide communication at the second frequency.

Technical advantages of the present invention include providing for power-conserving interference avoidance in communication between a mobile unit and a base unit in a telecommunication system. In particular, a slow hop count for a first component includes a summation of consecutive line quality indicators. A determination is made as to whether to change communication frequencies for the first component when the slow hop count is greater than a slow hop threshold. This determination is based on a power level of a second component and a communication strength received from the second component at the first component. Accordingly, a change in communication frequencies is made after evaluating whether interference is causing the poor line quality indicated by the slow hop count, as opposed to other factors such as low power for signal transmission. As a result, interference is avoided while power is conserved by providing for transmitting at lower power levels as long as good quality signals are being received.

Other technical advantages of the present invention will be readily apparent to one skilled in the art from the following figures, descriptions and claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
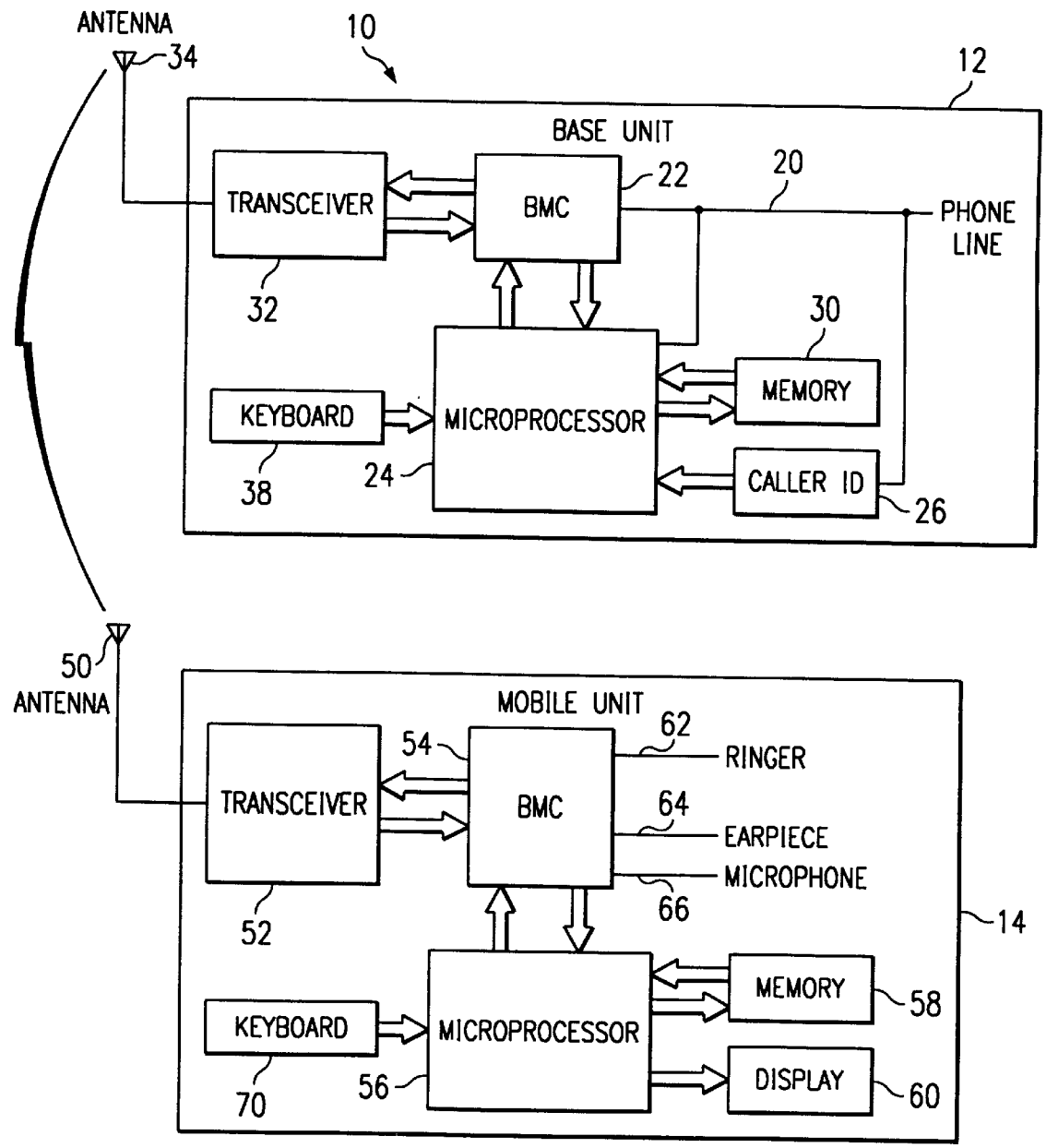
FIG. 1 is a block diagram illustrating a wireless telecommunication system including a base unit and a mobile unit constructed in accordance with the teachings of the present invention.
Figure 2:
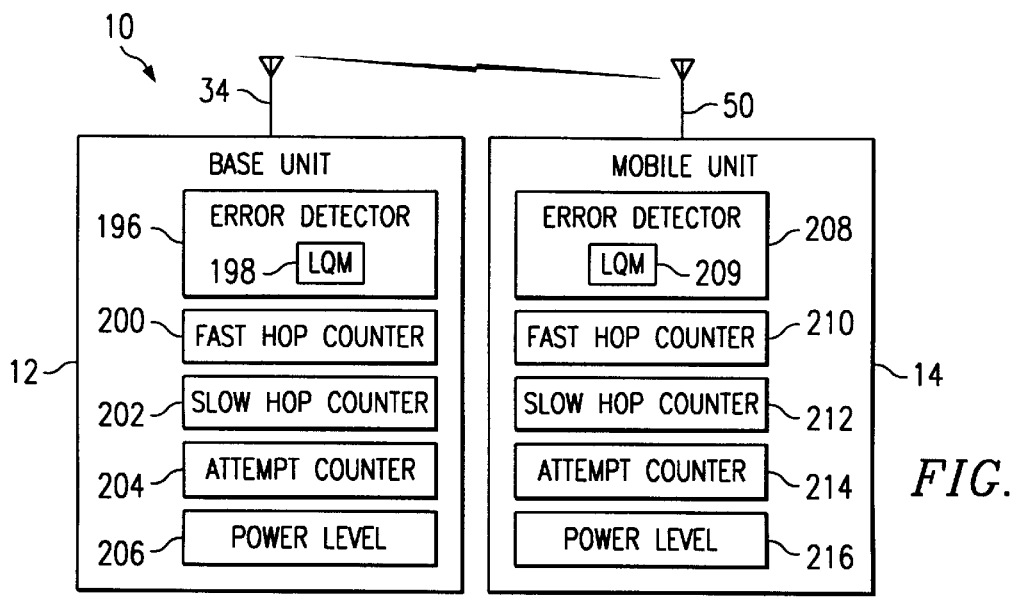
FIG. 2 is a block diagram illustrating a system for avoiding interference in wireless communication between the base unit and the mobile unit of FIG. 1 while conserving power in accordance with one embodiment of the present invention.
Figure 3:
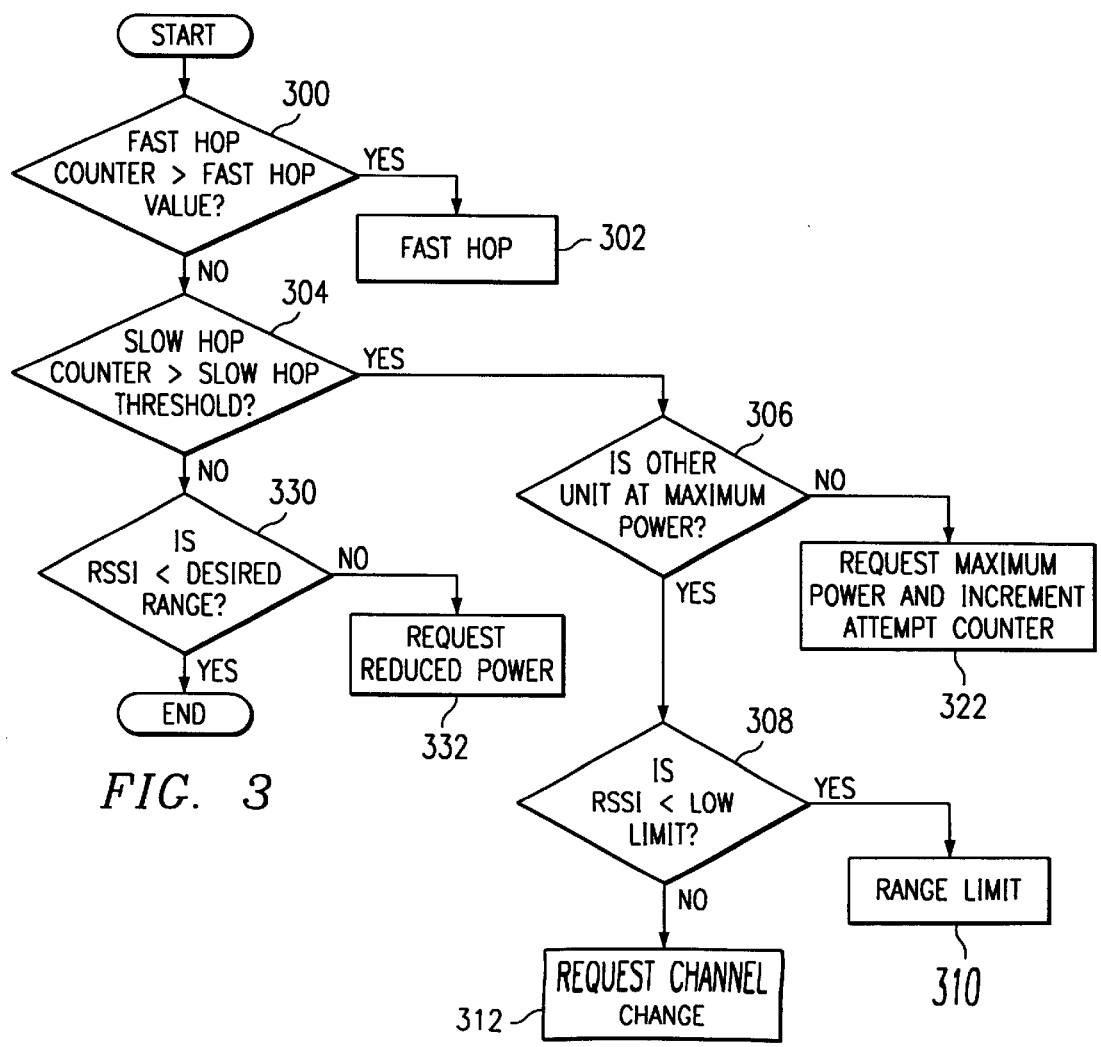
FIG. 3 is a flow diagram demonstrating one method for avoiding interference in wireless communication between the base unit and the mobile unit of FIG. 1 while conserving power.

The preferred embodiment of the present invention and its advantages are best understood by referring to FIGS. 1 through 3 of the drawings, like numerals being used for like and corresponding parts of the various drawings.

FIG. 1 is a block diagram illustrating a telecommunication system 10 including a base unit 12 and a mobile unit 14. The base unit 12 and the mobile unit 14 communicate with each other at a frequency in the industrial/scientific/medical (ISM) band. For example, the units 12 and 14 may communicate in the range of 2400 to 2483.5 MHz. It will be understood, however, that the base unit 12 and the mobile unit 14 may communicate with each other at other suitable frequencies without departing from the scope of the present invention.

The telecommunication system 10 illustrated in FIG. 1 is a wireless or cordless telephone system. In this exemplary embodiment, the mobile unit 14 comprises a mobile handset that communicates with the base unit 12 over discreet radio frequency channels. Although the telecommunication system 10 is illustrated as a cordless telephone system, it will be understood that the telecommunication system 10 may comprise any suitable type of wireless communication system. For example, the telecommunication system 10 may comprise a cellular telephone system, Local Multiple Distribution Service, and the like, without departing from the scope of the present invention.

In accordance with the exemplary embodiment shown in FIG. 1, the base unit 12 comprises a phone line 20 that is coupled to the Public Switched Telephone Network over a landline for receiving and transmitting voice or other data. For an incoming telephone call, data from the phone line 20 is passed to a microprocessor 24 and a caller ID interface 26. The caller ID interface 26 extracts caller ID information, such as a name and a telephone number associated with the originator of the telephone call, from the data on the phone line 20 and passes it to the microprocessor 24. The microprocessor 24 communicates with an internal memory 30 while processing the data received from the phone line 20 and the caller ID interface 26.

The microprocessor 24 then communicates the processed data from the phone line 20 and the caller ID interface 26, along with any additional data that needs to be transmitted to the mobile unit 14, to a burst mode controller (BMC) 22. The BMC 22 also receives data directly from the phone line 20, which is processed along with the data from the microprocessor 24. For example, the BMC 22 packages voice data from the phone line 20 with additional data from the microprocessor 24 into one frame structure. The BMC 22 also communicates the data to a transceiver 32 which transmits a signal through an antenna 34 to the mobile unit 14. The base unit 12 also comprises a keyboard 38 for inputting data to the microprocessor 24. The keyboard 38 may comprise a numeric keypad for entering a telephone number or other data. The keyboard 38 may also comprise a pager button for paging the mobile unit 14 such that the mobile unit 14 provides a sound for locating the mobile unit 14.

The mobile unit 14 receives the signal from the base unit 12 through an antenna 50 which passes the data to a transceiver 52. The transceiver 52 processes the data and it to a BMC 54, which unpackages the data and communicates with a microprocessor 56. The microprocessor 56 communicates with an internal memory 58 and sends data to a display 60, such as an LCD or LED. For example, the microprocessor 56 may send to the display 60 a name and a telephone number extracted by the caller ID interface 26 in the base unit 12.

The BMC 54 also sends a signal to a ringer 62 to notify a user of an incoming call. After the user responds by activating the mobile unit 14, the BMC 54 sends the voice data received from the base unit 12 to an earpiece 64. After the connection is completed, voice data for transmission to the phone line 20 through the base unit 12 is received by the BMC 54 from the microphone 66. This data is transmitted from the mobile unit 14 to the base unit 12 in a similar manner to the transmission of data from the phone line 20 to the earpiece 64. The mobile unit 14 also comprises a keyboard 70 for a user to enter information for communication to the microprocessor 56. This keyboard 70 may be, for example, a numeric keypad on a mobile telephone handset for entering a telephone number.

The same process is also used for an outgoing telephone call, beginning with the activation of the mobile unit 14, which sends a signal through the BMC 54 to the transceiver 52 and from the transceiver 52 to the antenna 50. From the antenna 50 of the mobile unit 14 the signal is transmitted to the antenna 34 of the base unit 12, which passes the signal to the transceiver 32. The transceiver 32 passes the signal through the BMC 22 to the phone line 20. The telephone number being called, voice and other data is then communicated back and forth between the mobile unit 14 and the base unit 12 as previously described.

FIG. 2 is a block diagram illustrating one embodiment of the telecommunication system 10 of FIG. 1, including a system for avoiding interference in wireless communication between the base unit 12 and the mobile unit 14 while conserving power. The base unit 12 comprises an error detector 196 for detecting errors in communication between the base unit 12 and the mobile unit 14. The error detector 196 includes a line quality monitor 198 for determining the quality of the signal being received at the base unit 12 from the mobile unit 14. The base unit 12 also comprises a fast hop counter 200 and a slow hop counter 202 for determining when and how the base unit 12 will change the frequency of communication due to a poor quality signal.

As described in more detail below, the base unit 12 changes frequencies quickly when catastrophic interference greatly reduces the signal quality. This is called a fast hop. However, if the signal quality is poor, but not poor enough for a fast hop, the base unit 12 determines whether to change frequencies after evaluating other factors. This is called a slow hop. The base unit 12 comprises an attempt counter 204 and a power level field 206 that are used in conjunction with the slow hop counter 202 by the base unit 12 to evaluate the other factors in order to determine whether or not to complete a slow hop.

Similarly to the base unit 12, the mobile unit 14 comprises an error detector 208 for detecting errors in communication between the base unit 12 and the mobile unit 14. The error detector 208 includes a line quality monitor 209 for determining the quality of the signal being received at the mobile unit 14 from the base unit 12. The mobile unit 14 also comprises a fast hop counter 210 and a slow hop counter 212 for determining when and how the mobile unit 14 will change the frequency of communication due to a poor quality signal.

As with the base unit 12 and as described in more detail below, the mobile unit 14 performs a fast hop when catastrophic interference greatly reduces the signal quality. However, if the signal quality is poor, but not poor enough for a fast hop, the mobile unit 14 determines whether to perform a slow hop after evaluating other factors. The mobile unit 14 comprises an attempt counter 214 and a power level field 216 that are used in conjunction with the slow hop counter 212 by the mobile unit 14 to evaluate the other factors in order to determine whether or not to complete a slow hop.

For both the base unit 12 and the mobile unit 14, the line quality monitors 198 and 209 determine a plurality of successive line quality indicators at regular intervals. Each line quality indicator comprises a value associated with the quality of the received signal. According to the disclosed embodiment, a higher value for a line quality indicator corresponds to a lower quality signal.

The values for all the counters 200, 202, 210 and 212 are based on the line quality indicators from the line quality monitor 198. The fast hop counters 200 and 210 are used to determine whether catastrophic interference is affecting the signal such that the corresponding unit 12 or 14 should change communication frequencies relatively quickly. Each fast hop counter 200 and 210 is incremented or cleared with each successive line quality indicator from the corresponding line quality monitor 198 or 209. Thus, for each line quality indicator over a fast hop threshold, the corresponding fast hop counter 200 or 210 is incremented. However, if a line quality indicator is not greater than the fast hop threshold, the corresponding fast hop counter 200 or 210 is cleared. If the fast hop counter 200 reaches a pre-determined value, indicating that an equivalent number of consecutive line quality indicators were greater than the fast hop threshold, the corresponding unit 12 or 14 performs a fast hop.

The slow hop counters 202 and 212 are used to determine whether interference that is not catastrophic is nevertheless sufficient to prompt the corresponding unit 12 or 14 to change communication frequencies. The slow hop counters 202 and 212 include a continuing summation of consecutive line quality indicators from the corresponding line quality monitors 198 and 209 over a pre-determined amount of time. If a slow hop counter 202 or 212 reaches a value greater than a slow hop threshold, the corresponding unit 12 or 14 initiates a slow hop determination procedure, as described below. However, if after the pre-determined amount of time the slow hop counters 202 and 212 have not reached the slow hop threshold, the slow hop counters 202 and 212 are cleared to a value of zero before including a continuing summation of additional consecutive line quality indicators from the line quality monitors 198 and 209.

The slow hop determination procedure is initiated in order to determine whether or not to perform a slow hop if a slow hop counter 202 or 212 reaches the slow hop threshold during the pre-determined amount of time. This procedure includes a determination of whether the unit 14 or 12 other than the unit 12 or 14 with the slow hop counter 202 or 212 that has reached the slow hop threshold ("the other unit") is transmitting signals at a maximum power level. According to one embodiment, both the base unit 12 and the mobile unit 14 may operate at four different power levels, as indicated by the power level fields 206 and 216. It will be understood, however, that the units 12 and 14 may operate at any suitable number of power levels without departing from the scope of the present invention. Thus, if a slow hop counter 202 or 212 reaches the slow hop threshold, the corresponding unit 12 or 14 requests the other unit 14 or 12 to transmit at a maximum power level.

When this request is made, the corresponding attempt counter 204 or 214 for the unit 12 or 14 making the request is incremented. If the same slow hop counter 202 or 212 again reaches the slow hop threshold, the corresponding unit 12 or 14 determines by the value of the attempt counter 204 or 214 that the other unit 14 or 12 is transmitting at maximum power.

The slow hop determination procedure also includes a determination by the unit 12 or 14 of whether a radio signal strength indicator (RSSI) is less than a lower limit for signal strength. If this is the case, the other unit 14 or 12 is outside of the range in which communication is possible. However, if the RSSI is not less than the lower limit, the unit 12 or 14 performs a slow hop by signaling the other unit 12 or 14 that a slow hop is being performed and providing communication at a subsequent frequency.

FIG. 3 is a flow diagram demonstrating one method for avoiding interference in wireless communication between the base unit 12 and the mobile unit 14 of FIG. 1 while conserving power. The method is preferably performed by both the base unit 12 and the mobile unit 14 simultaneously. The method begins at decisional step 300 where the fast hop counters 200 and 210 are compared to a fast hop value. If a fast hop counter 200 or 210 is greater than the fast hop value, the method follows the Yes branch from decisional step 300 to step 302 where the corresponding unit 12 or 14 performs a fast hop to a subsequent frequency. However, if the fast hop counters 200 or 210 are not greater than the fast hop value, the method follows the No branch from decisional step 300 to decisional step 304 where the slow hop counters 202 and 212 are compared to a slow hop threshold.

If a slow hop counter 202 or 212 is greater than the slow hop threshold, the method follows the Yes branch from decisional step 304 to decisional step 306 where the corresponding unit 12 or 14 determines whether the other unit 14 or 12 is transmitting at maximum power. According to one embodiment, this determination is made by evaluating the attempt counter 204 or 214 which indicates whether the unit 12 or 14 previously requested the other unit 14 or 12 to transmit at a maximum power level. If the other unit 14 or 12 is transmitting at maximum power, the method follows the Yes branch from decisional step 306 to decisional step 308 where the base unit 12 determines whether the RSSI is less than the lower limit. If the RSSI is less than the lower limit, the method follows the Yes branch from decisional step 308 to step 310 where the unit 12 or 14 determines that the other unit 14 or 12 is outside the range for communication.

Returning to decisional step 308, if the RSSI is not less than the lower limit, the method follows the No branch to step 312 where the unit 12 or 14 performs a slow hop by changing to a subsequent frequency and requesting the other unit 14 or 12 to change to the subsequent frequency.

Returning to decisional step 306, if the other unit 14 or 12 is not transmitting at maximum power, the method follows the No branch to step 322 where the unit 12 or 14 requests the other unit 14 or 12 to transmit at maximum power and increments the attempt counter 204 or 214.

Returning to decisional step 304, if the slow hop counters 202 and 212 are not greater than the slow hop threshold, the method follows the No branch to decisional step 330 where the unit 12 or 14 determines whether the RSSI is less than the desired range. If the RSSI is less than the desired range, the method follows the Yes branch from decisional step 330 and the method comes to an end. However, if the RSSI is not less than the desired range, the method follows the No branch from decisional step 330 to step 332 where the unit 12 or 14 requests the other unit 14 or 12 to reduce the transmission power as indicated in the power level field 216 or 206 to a lower power level.

While the invention has been particularly shown and described by the foregoing detailed description, it will be understood by those skilled in the art that various other changes in form and detail may be made without departing from the spirit and scope of the invention.

What is claimed is:

1. A method for avoiding interference in a wireless telecommunication system, comprising:

providing communication between a first and second component at an initial frequency;

determining a plurality of successive line quality indicators at a line quality monitor of the first component;

summing consecutive line quality indicators over a predetermined time to determine a slow hop count;

determining whether the slow hop count is greater than a slow hop threshold;

determining whether to provide communication with the first component at a second frequency when the slow hop count is greater than the slow hop threshold, the determination based on a power level of the second component and a communication strength received from the second component at the first component; and communicating a signal from the first component to the second component requesting the second component to provide communication at the second frequency.

2. The method of claim 1, the first component comprising a mobile unit and the second component comprising a base unit.

3. The method of claim 1, the first component comprising a base unit and the second component comprising a mobile unit.

4. The method of claim 1, further comprising providing communication with the first component at the second frequency when a specified number of consecutive line quality indicators is greater than a fast hop threshold.

5. The method of claim 4, the first component comprising a mobile unit and the second component comprising a base unit.

6. The method of claim 4, the first component comprising a base unit and the second component comprising a mobile unit.

7. A system for avoiding interference in a wireless telecommunication system, comprising:

a first component;

a second component for providing wireless communication with the first component at an initial frequency;

a line quality monitor for the first component, the line quality monitor for determining a plurality of successive line quality indicators;

a slow hop counter for summing consecutive line quality indicators over a predetermined time to determine a slow hop count and for determining whether the slow hop count is greater than a slow hop threshold;

an error detector for determining whether to provide communication with the first component at a second frequency when the slow hop count is greater than the slow hop threshold, the determination based on a power level of the second component and a communication strength received from the second component at the first component; and the first component operable to communicate a signal to the second component requesting the second component to provide communication at the second frequency.

8. The system of claim 7, the first component comprising a mobile unit and the second component comprising a base unit.

9. The system of claim 7, the first component comprising a base unit and the second component comprising a mobile unit.

10. The system of claim 7, further comprising:

a fast hop counter for monitoring a number of consecutive line quality indicators greater than a fast hop threshold to determine a fast hop count; and the error detector also for providing communication with the first component at the second frequency when the fast hop count is greater than a fast hop value.

11. The system of claim 10, the first component comprising a mobile unit and the second component comprising a base unit.

12. The system of claim 10, the first component comprising a base unit and the second component comprising a mobile unit.

* * * * *